Nov. 1, 1960 M. L. BENJAMIN ET AL 2,958,533
PNEUMATIC CHUCK
Filed Feb. 24, 1959 3 Sheets-Sheet 1

INVENTOR.
MILTON L. BENJAMIN
FRANKLYN E. WINNEN
BY
Oberlin, Maky, & Donnelly
ATTORNEYS

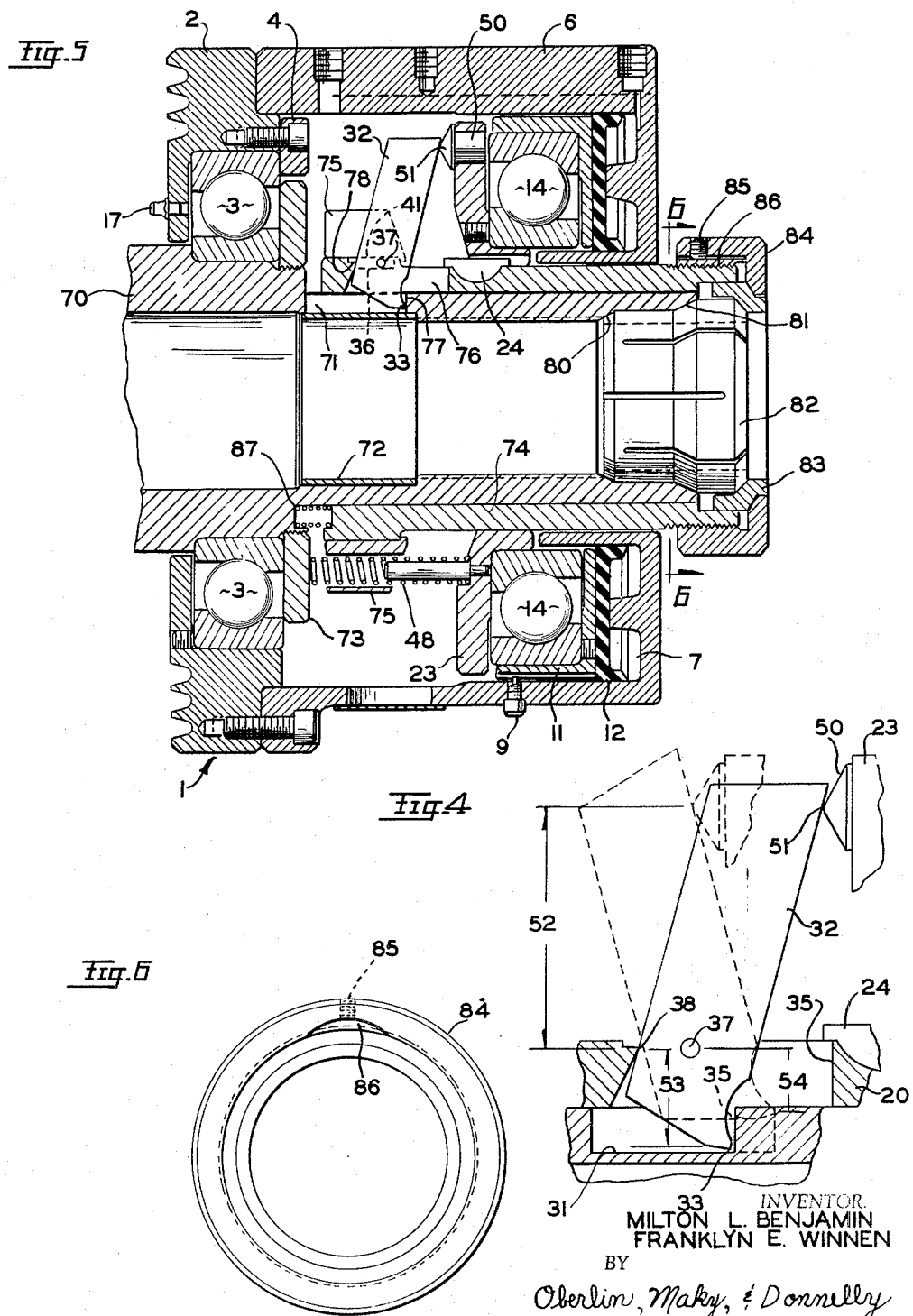

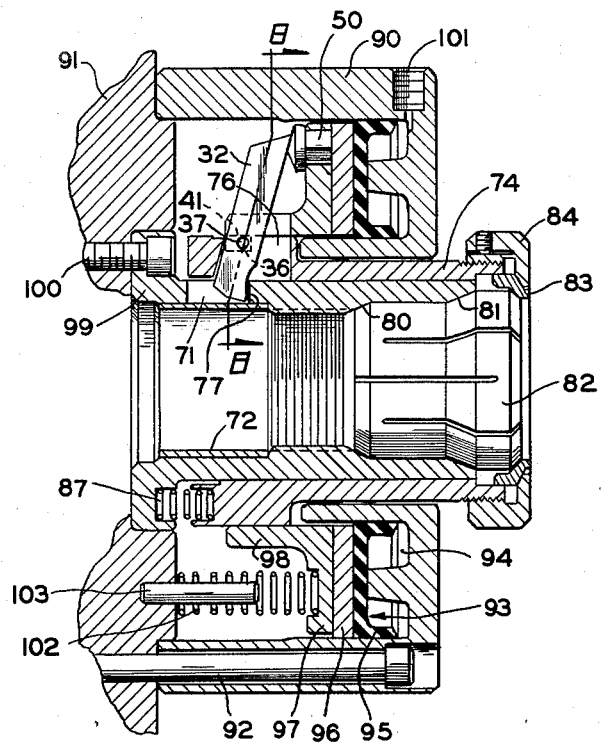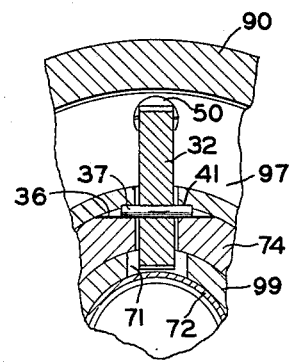

United States Patent Office 2,958,533
Patented Nov. 1, 1960

2,958,533

PNEUMATIC CHUCK

Milton L. Benjamin, Shaker Heights, and Franklyn E. Winnen, Cleveland, Ohio, assignors to Erickson Tool Company, Solon, Ohio, a corporation of Ohio Filed Feb. 24, 1959, Ser. No. 795,065

7 Claims. (Cl. 279—4)

The present invention relates generally as indicated to a pneumatic chuck and more particularly to certain improvements in a chuck of the type disclosed in our Patent No. 2,515,183, granted July 18, 1950.

It is one main objective of this invention to provide a simple and efficient form of pneumatic chuck whereby workpieces, tools, etc. may be securely gripped by the collet, arbor, or like chuck component.

It is another object of this invention to provide a novel form of pneumatic chuck which is reversible, that is, either end thereof may be mounted on a machine tool spindle according to whether a pulling force or a pushing force is required for the actuation of a collet, an arbor, or like chuck component.

It is another object of this invention to provide a pneumatic chuck which is arranged to provide for a progressively increasing force multiplication with the greatest force for gripping being applied at the terminal portion of the chuck actuating operation.

It is another object of this invention to provide in a pneumatic chuck a novel arrangement for lubricating the antifriction bearings thereof and for introducing into the operating mechanism lubricant laden air which serves to lubricate and cool the working parts.

It is another object of this invention to provide in a dog or lever actuated pneumatic chuck a simple form of axial guide and retainer for the several dogs or levers.

It is another object of this invention to provide a piston-actuated chuck in which there is a line contact between piston projections and actuating dogs and additional line contacts between the dogs and relatively movable parts of the chucking mechanism to make possible the aforesaid progressively increasing force multiplication as the dogs are actuated by the piston, and also to decrease stresses as compared with the point contacts hitherto provided in chucks of this type.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principles of the invention may be employed.

In said annexed drawings:

Fig. 4 is an enlarged fragmentary cross-section view showing two positions of one of the actuating dogs and further showing the relationship of the moment arms thereof in those two positions;

Fig. 5 is a longitudinal cross-section view similar to Fig. 1 but illustrating another form of the invention as adapted for use with a collet chuck;

Fig. 6 is an end elevation view of the nose ring employed in the Fig. 5 embodiment, as viewed along the line 6—6, Fig. 5;

Fig. 7 is a longitudinal cross-section view similar to Figs. 1 and 5 except illustrating yet another embodiment of this invention; and, Fig. 8 is a fragmentary cross-section view taken substantially along the line 8—8, Fig. 7.

Figure 1:
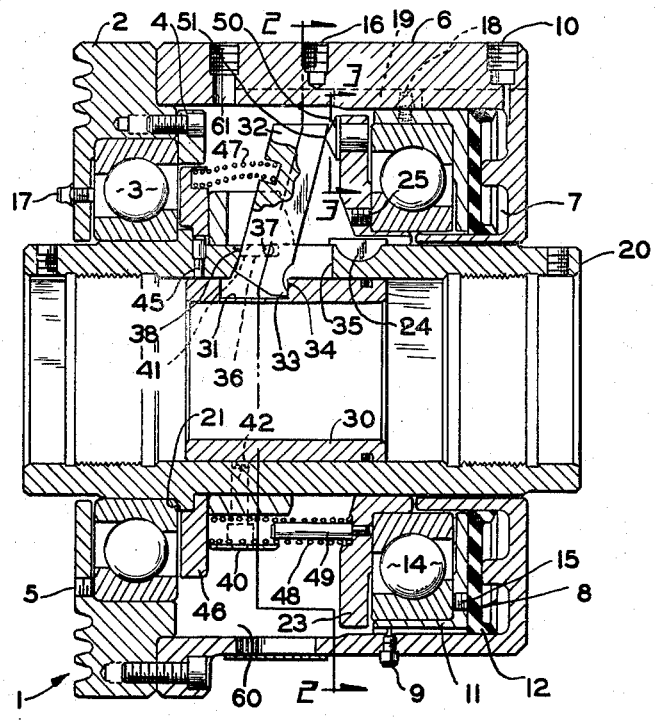
Fig. 1 is a longitudinal cross-section view of one embodiment of this invention, such section having been taken substantially along the line 1—1, Fig. 2.
Figure 2:
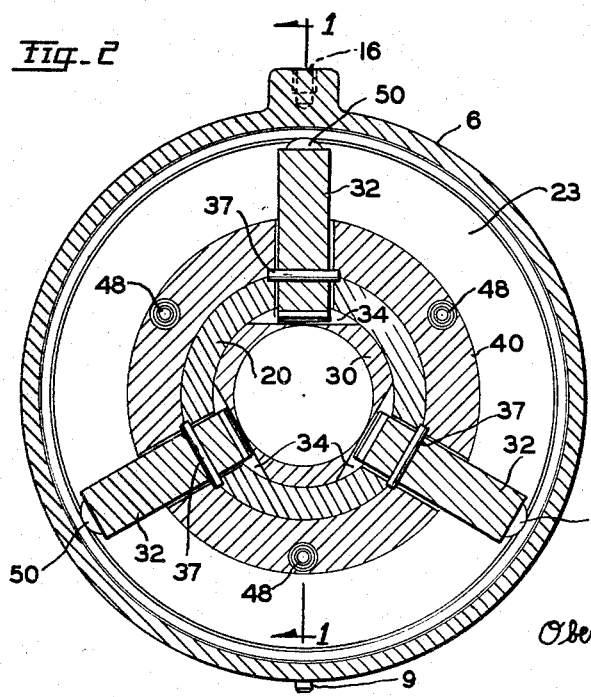
Fig. 2 is a transverse cross-section view taken substantially along the line 2—2, Fig. 1.

Referring now to the embodiment of the pneumatic chuck shown in Figs. 1 to 4, the same comprises a two-part housing 1 of which the base plate 2 has pressed therein the outer race of the antifriction bearing 3, the bearing 3 being held in as by means of a series of screw-attached clips 4 and removal of the bearing being facilitated by the jack screws 5. The other part 6 of the housing provides a pneumatic cylinder 7 in which the piston 8 is axially slidably keyed as by means of the key screw 9, and is provided with a threaded port 10 for connection with an air pressure supply source through a suitable valve (not shown) which is adapted to selectively permit flow of air under pressure into said cylinder 7 or to vent the cylinder 7.

The piston 8 comprises an L-shaped ring 11 to the radially inwardly extending flange of which the piston seal ring 12 of flexible plastic or rubber-like material is secured as by bonding, said seal ring 12 being provided with sealing lips as shown that are in sliding, sealed engagement with the concentric outer and inner walls of the cylinder 7.

Press-fitted into the axial flange or skirt of the L-shaped ring 11 is the outer race of another antifriction bearing 14 and again jack screws 15 are provided to facilitate removal of the bearing 14 from the L-shaped ring 11. The housing 1 may be held against rotation as by means of a rod, not shown, which is adapted to be threaded into the opening 16 of the cylinder. The antifriction bearings 3 and 14 are adapted to be supplied with lubricant such as grease, for example, through the grease fittings 17 and 18, the latter extending through a longitudinal slot 19 formed in the housing part 6, the slot 19 being of sufficient axial length to permit axial reciprocation of the piston 11 in the cylinder 7 but without the seal ring 12 uncovering such slot 19.

Journalled in the housing 1 by the widely spread apart and heavy duty bearings 3 and 14 is a spindle adapter 20 which, in this embodiment of the invention, is so formed that either end thereof may be secured to a machine tool spindle depending upon whether the chuck is to be actuated by axial pushing force or by axial pulling force. Thus, the inner race of the bearing 3 is a force fit adjacent one end of the spindle adapter against shoulder 21 and the inner race of the other bearing 14 is a force fit on the inner axial flange of the lever or dog actuating ring 23 which is axially slidably keyed on the spindle adapter 20 as by means of the key 24. Jack screws 25 are employed to facilitate separation of ring 23 and bearing 14.

Referring now to the chuck actuating mechanism, there is located within the spindle adapter 20 an axially slidable sleeve 30 which is formed with three uniformly spaced peripheral recesses 31 to receive the radially inner ends of a corresponding number of levers or dogs 32, the inner tips 33 of the dogs being engaged with the plane end faces 34 of the recesses 31, said faces 34 lying in a plane perpendicular to the chuck axis. The spindle adapter 20, in turn, is formed with three slots 35 radially therethrough through which the dogs 32 extend radially, and in the region of the slots there are milled flat bottom recesses 36 which are perpendicular to opposite sides of the respective slots 35 and which are engaged by the end portions of the pins 37 that extend transversely through the respective dogs 32. The left-hand end of each slot 35 is beveled as shown to provide a line contact at 38 with the rear side of the dog 32 that is opposite the tip 33 thereof at a region radially outward of the tip 33.

In order to retain the dogs 32 against radial outward displacement there is provided a slotted ring 40 which is axially slotted to embrace the opposite sides of each dog 32 and which has milled flats 41 to engage the radially outer sides of the end portions of the respective pins 37 so as to form with the other flat surfaces 36 a guideway to permit movement of the respective pins 37 in an axial direction as the respective dogs 32 are swung, for example, from the solid line position of Fig. 4 to the dotted line position. The ring 40 may be secured on spindle adapter 20 as by radial screws 42.

Figure 3:
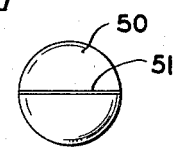
Fig. 3 is an elevation view as viewed from line 3—3, Fig. 1 of one of the dog actuating buttons or projections of the piston assembly.

Keyed to the spindle adapter 20, as by the pin 45, is a spring backup ring 46 formed with three recesses to receive one end of the respective dog return springs 47, the other end of said springs 47 being fitted in recesses formed in the respective dogs 32. The slotted ring 40 aforesaid, in turn, is provided with three holes therethrough through which the piston return springs 48 extend to bear on back up ring 46, these springs 48 additionally being guided on pins 49 affixed to the dog actuating ring 23. The last-mentioned ring 23 is provided with three equally spaced buttons or pins 50 which are beveled as best shown in Figs. 1 and 3, so as to provide a line contact 51 with the outer end portions of the respective dogs 32 at a region radially outward of the tip 33 and line contact 38.

From the foregoing description, it can now be seen that when air under pressure is admitted into the cylinder 7 through the port 10 the piston 8 (including bearing 14 and ring 23) will be forced axially toward the left, as viewed in Fig. 1, whereupon the dogs 32 will be swung from the solid line position of Fig. 4 to the dotted line position. It is to be noted that the moment arm 52 remains constant, whereas the moment arm between tip 33 and line 38 gradually decreases during the swinging of the dogs, as represented by the reference numerals 53 and 54. In the particular example given, the sleeve member 30 will be shifted to the right with respect to the spindle adapter 20 a distance of 11/32" and the moment arm ratios, that is, the dimensions 52 to 53 and 52 to 54, changes from about 2.7:1 to about 4:1. Thus, the greatest mechanical advantage is achieved at the very end of the gripping of the workpiece or tool shank by the collet, arbor or other movable chuck component that may be actuated as the result of the movement of the sleeve member 30 toward the right, as just explained.

It is to be noted that the housing 1 is provided with a chamber 60 to which the port 61 leads and it has been found desirable to introduce lubricant laden air into such chamber not only to lubricate the dogs 32, pivots 37, and other moving parts therein, but also to cool these parts, and also the bearings 3 and 14.

With reference to the reversibility of the pneumatic chuck shown in Figs. 1 to 4, let us first assume that the left-hand end of the spindle adapter 20 is screwed onto and locked onto the machine spindle. In that case, the collet chuck, arbor, or other gripping device, will be mounted in the right-hand end of the spindle adapter 20, whereupon the right-hand movement of the sleeve member 30, as just described, will bear against a movable actuating component of the collet chuck or arbor, to effect contraction or expansion thereof to grip a workpiece or the like for rotation in unison with the spindle adapter 20 and spindle. On the other hand, let us assume that the right-hand end of the spindle adapter 20 is screwed onto the end of the spindle and locked thereon. In that case, the collet chuck, arbor, or the like, will be mounted in the left-hand end of the spindle adapter and, therefore, the aforesaid rightward movement of the sleeve 30 will exert a rightward pulling force on the movable member of the collet chuck, or arbor and, of course, it will be required that the right-hand end of the sleeve 30 have engagement with a radially extending flange or collar of such movable collet chuck or arbor part. Typical collet chucks are shown in the embodiments of this invention depicted in Figs. 5, 6, and 7, 8.

In either case, when the air pressure in the cylinder 7 is vented the piston return springs 48 will be effective to move the piston 8 back toward the right to the position sown in Fig. 1 and the dog return springs 47 will effect return of the dogs 32 to the position shown in Fig. 1.

An important feature of this invention is the provision of the wide line contacts 33, 38, and 51 and the progressively increasing mechanical advantage as the dogs 32 are actuated in consequence of the movement of piston 8.

Referring now to the embodiment of the pneumatic chuck shown in Figs. 5 and 6, the basic unit is substantially the same as that just described and, therefore, the same reference numerals have been used to indicate the same or similar parts and, therefore, repetition of the construction and operation of these same or similar parts is not deemed necessary.

One difference in the Figs. 5 and 6 pneumatic chuck is that the spindle 70 itself (or an adapter 70 attached to the spindle), is formed to actuate a collet chuck of the general type disclosed for example in the Milton L. Benjamin et al. Patent No. 2,358,300, granted September 19, 1944, and also, as shown in the aforesaid Patent No. 2,515,183. Thus, the axially fixed rotary spindle 70 (or spindle adapter 70), is, itself, integrally formed with the slots 71 closed by sleeve 72 to receive the inner end portions of the dogs 32 and the journalling of the spindle 70 with respect to the housing 1 is accomplished in much the same manner as in Fig. 1, except that the inner race of the bearing 3 is held on said spindle as by means of the nut 73 which also serves as an abutment for the piston return springs 48 which extend through holes in the dog retainer segments 75 that are bolted onto the axial slidable nose piece 74. In this case, the dog retainers 75 are in the form of separate segments and provided with parallel flat surfaces 36 and 41 which form a guideway to allow pivotal rocking motion of the respective dogs 32 while also permitting movement of the respective pins 37 transversely of their axes. The slots 76 comparable with the slots in the spindle adapter 20 in Fig. 1 are formed in the nose piece 74 and thus it can be seen that when the piston 8 is forced to the left, as viewed in Fig. 5, the dogs 32 will be swung in a counterclockwise direction and because the surface 77 against which the tip 33 of each dog 32 bears is fixed, the rear side which bears on the rear beveled edge 78 of the slot 76 will cause leftward movement of the nose piece 74, and as before, the mechanical advantage becomes progressively greater as the dogs 32 are thus swung counterclockwise in a manner similar to that shown in Fig. 4.

The end of the spindle 70 is formed with axially spaced apart and parallel cam surfaces 80 and 81 adapted to engage complementary frusto-conical surfaces of this contractible collet 82 and bearing on the outer end of the collet 82 is a nose ring 83 which is piloted in the counterbored end of the nose piece 74 and, in turn, there is screwed onto the end of the nose piece 74 the adjustable nose piece nut 84, the latter being locked in adjusted position as by means of a setscrew 85, which bears on an integral deformable segmental portion 86 thereof, as best shown in Fig. 6. Thus, it will be seen that when the nose piece 74 (including part 84) is drawn toward the left, the nose ring 83 likewise, will be drawn toward the left to exert axial pressure on the contractible collet 82, whereby due to the cooperating action of the frusto-conical surfaces of collet 82 with cam surfaces 80 and 81, the collet 82 will be contracted to grip a workpiece.

When the cylinder 7 is vented the piston return springs 48 are effective to move the piston 8 toward the right and in this case instead of providing dog return springs 47, as in Fig. 1, there are provided springs 87 compressed between the spindle 70 and the nose piece 74 which urges the latter toward the right to permit the collet 82 to release its grip on the workpiece, and of course, such spring return of the nose piece 74 returns the dogs 32 to the solid line position shown in Fig. 5 by pressure exerted at the radially offset lines 33 and 78.

Referring now to the pneumatic chuck shown in Figs. 7 and 8, this form of the chuck more closely resembles that of Fig. 5 than it does that of Fig. 1, in that the nose piece 74 (including part 84), nose ring 83 and collet 82, are substantially identical with the same numbered parts shown in Fig. 5.

However, one basic difference in the Figs. 7 and 8 construction from the others disclosed herein, is that the housing part 90 or cylinder, is adapted to be fixedly mounted on a machine part 91 as by means of a circular series of bolts 92. The piston 93 in cylinder 94 comprises merely the sealing ring 95 with its flexible lips secured to a flat backup ring 96 and, in turn, the backup ring 96 engages the dog actuator ring 97 and carries the dog-engaging pins or buttons 50. In addition, this dog actuating ring 97 is formed with an integral axial flange 98 which is slotted as shown to provide the dog retainer surfaces 36 and 41. As in Fig. 5, there are provided nose piece return springs 87. The chuck body part 99 which is formed with the collet cam surfaces 80 and 81 is formed with a peripheral flange which is secured to the machine part 91 as by the series of screws 100.

Thus, when air under pressure is admitted through the port 101 into the cylinder 94, the piston 93 is moved toward the left to effect a counterclockwise rocking motion of the dogs 32 and because the surfaces 77 of each slot 71 in the tubular member 99 is fixed, the rear side of the dogs 32 will bear on the rear edge of each slot 76 in the nose piece 74 to move the same axially toward the left and thus effect contraction of the collet 82 into gripping engagement with the work. When the cylinder 94 is vented the piston return springs 102 guided on pins 103 projecting from the machine part 91 are effective to return the piston 93 toward the right, and at the same time, the nose piece return springs 87 are effective to release the collet 82 and to swing the dogs 32 back to their original positions as shown in Fig. 7. In Figs. 7 and 8 the parts which correspond to the parts in Figs. 5 and 6 employ the same reference numerals to avoid the need of repeating the details of construction of such parts.

In conclusion, the several forms of pneumatic chuck herein disclosed have at least one important feature in common and that is the novel arrangement of the dogs 32 so that one moment arm remains constant and another moment arm progressively decreases in length so as to effect a progressively increasing ratio in the lengths of such moment arms for stronger gripping of workpieces without corresponding increase in fluid pressure or cylinder size.

Other modes of applying the principle of the invention may be employed, change being made as regards the details described, provided the features stated in any of the following claims, or the equivalent of such, be employed.

We therefore particularly point out and distinctly claim as our invention:

1. In a pneumatic chuck, the combination of a housing formed with a cylinder; a piston axially reciprocable in said cylinder; a pair of relatively axially movable members telescoped one within the other and one of which is adapted to actuate the movable component of a collet chuck, arbor, or the like; and a plurality of radially disposed pivoted dogs each having a radially outer surface that is engaged with said piston, and radially offset inner surfaces on opposite sides thereof engaged respectively with said members whereby said members are relatively moved in an axial direction as a consequence of axial movement of said piston, the pivots of said dogs being initially located substantially radially outward of the innermost one of said inner surfaces thereof and substantially laterally opposite the other of said innermost surfaces whereby the mechanical advantage progressively increases during movement of said piston.

2. The chuck of claim 1 wherein said dogs, said piston, and said members are formed to provide parallel lines of contact where engaged.

3. The chuck of claim 1 wherein means are provided to guide the pivot of each dog for axial movement to maintain contact with said members during swinging thereof.

4. The chuck of claim 3 wherein each dog has a pin extending transversely therethrough, and said means comprises a retainer secured on the outer one of said members, said retainer and outer member being formed with parallel faces embracing the ends of said pins.

5. The chuck of claim 3 wherein each dog has a pin extending transversely therethrough, and said means comprises a retainer secured on said piston, said retainer and the outer one of said members being formed with parallel faces embracing the ends of said pins.

6. In a pneumatic chuck, the combination of a housing formed with an annular cylinder; an annular piston axially reciprocable in said cylinder; a pair of relatively axially movable members telescoped one within the other centrally in said housing and one of which is adapted to actuate the movable component of a collet chuck, arbor, or the like; a pair of antifriction bearings mounted in axially spaced apart relation in said housing and piston respectively and on the outer one of said members to support the latter for rotation with respect to said housing; an annular dog actuator ring secured to said piston and axially slidably keyed on said outer member; a plurality of radially extending dogs pivotally secured to said outer member and having a radially outer surface engaged by said ring; said outer member being formed with radial slots therethrough through which said dogs extend, and said inner member being formed with recesses into which the inner ends of said dogs extend; said dogs having radially offset inner surfaces on opposite sides thereof engaged respectively opposite end walls of said slots and recesses whereby said members are relatively moved in an axial direction as a consequence of axial movement of said piston, the pivots of said dogs being initially located substantially radially outward of the innermost one of said inner surfaces thereof and substantially laterally opposite the other of said innermost surfaces whereby the mechanical advantage progressively increases during movement of said piston.

7. The chuck of claim 6 wherein either end of said outer member is adapted to be secured to a machine tool spindle whereby said inner member, upon swinging of said dogs, is moved axially toward or away from the spindle to exert pushing or pulling force on such movable component of the collet chuck, arbor, or the like.

References Cited in the file of this patent

UNITED STATES PATENTS 2,515,183    Benjamin et al. -------- July 18, 1950